Figure 1:
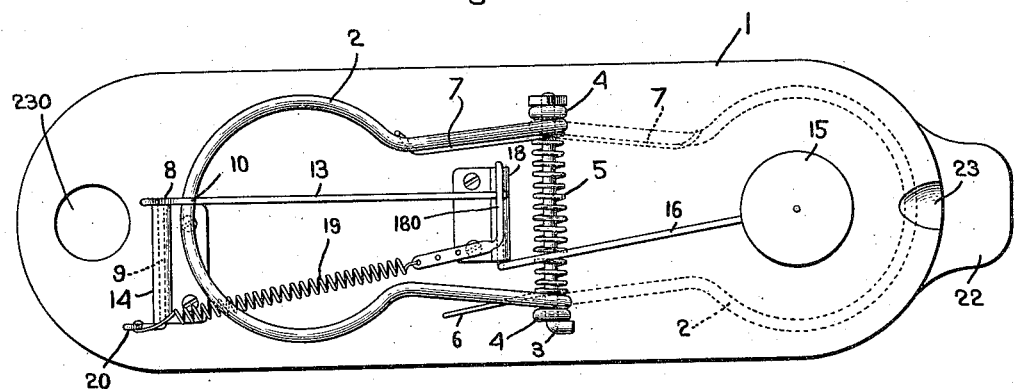

G. E. BROWN.
ANIMAL TRAP.
APPLICATION FILED JULY 22, 1915.

1,164,916.

Patented Dec. 21, 1915.

Inventor.
George E. Brown
by Heard Smith & Tennant
Atty's.

UNITED STATES PATENT OFFICE.

GEORGE E. BROWN, OF LOWELL, MASSACHUSETTS.

ANIMAL-TRAP.

1,164,916.  Specification of Letters Patent.  Patented Dec. 21, 1915.

Application filed July 22, 1915. Serial No. 41,367.

*To all whom it may concern:*

Be it known that I, GEORGE E. BROWN, a citizen of the United States, residing at Lowell, county of Middlesex, State of Massachusetts, have invented an Improvement in Animal-Traps, of which the following description, in connection with the accompanying drawing, is a specification, like characters on the drawing representing like parts.

This invention relates to animal traps of that type involving a base, a spring-impelled striker pivotally connected thereto, a catch for holding the striker in its open position and a bait-holding device having associated therewith means to lock the catch in operative position.

The objects of the invention are to provide a novel animal trap of this type which can be readily set by the mere act of swinging the striking member from its closed to its open position and without the necessity of manipulating either the catch or the bait-holding member to lock the catch in operative position; and otherwise to improve animal traps of this nature, all as will be more fully hereinafter described.

In order to give an understanding of my invention I have illustrated in the drawings a selected embodiment thereof which will now be described, after which the novel features will be pointed out in the appended claims.

Figure 2:
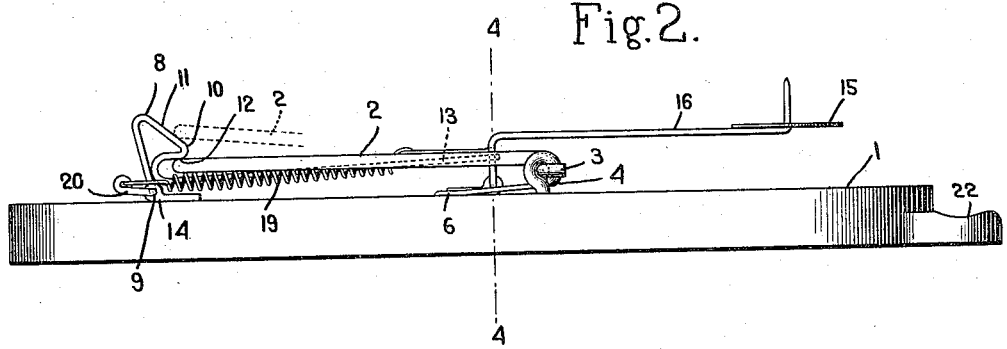
Figure 3:
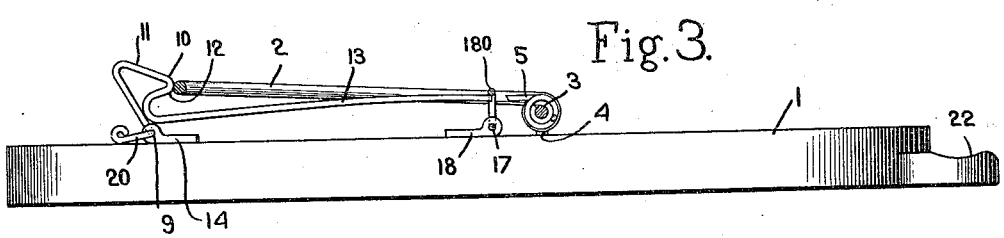
Figure 4:
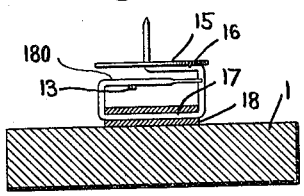

Figure 1 is a plan view of my improved rat trap showing it set; Fig. 2 is a side view of Fig. 1; Fig. 3 is similar to Fig. 2 with some of the parts omitted and showing how the trap is set; Fig. 4 is a sectional detail on the line 4—4, Fig. 2, some of the parts being omitted.

1 indicates a base on which the operative parts of the trap are mounted. The striker is shown at 2 and it has a general U-shape. The ends of the arms thereof are pivotally connected to the base 1 as usual in animal traps of this nature, and in the illustrated embodiment of my invention this is accomplished by pivoting the ends of the arms of the striker to a rod 3 which is secured to the base 1 by means of fastenings 4. Any other suitable way of pivoting the striker to the base might be employed, however, without departing from the invention.

The striker is acted on by a spring 5 which acts to turn it about its pivot and carry it into the dotted line position Fig. 1 when the trap is sprung. This spring 5 is shown as a coiled spring encircling the shaft 3, one end 6 of the spring being secured to the base and the other end 7 being secured to one arm of the striking member.

When the trap is set the striking member 2 is swung from the dotted to the full line position Fig. 1, and it is held in this position by a catch, as usual in traps of this type. In my invention the trap can be set merely by the act of swinging the striking member 2 from the dotted to the full line position, Fig. 1, the catch being so constructed that it will automatically engage and lock the striker in this position without the necessity of any hand manipulation. This catch is shown generally at 8 and is pivotally mounted to the base at 9. The catch is formed with the striker-engaging nose 10 which has the beveled surface 11 and the striker-engaging surface 12 and is also provided with the arm 13 which coöperates with the bait-supporting member to lock the catch in its operative position. This catch can conveniently be made from a piece of wire which is bent to the proper shape, said wire having the portion 9 thereof extending parallel to the surface of the base 1 and being held for turning movement in a bearing member 14 secured to the base. This portion 9, therefore, constitutes the axis about which the catch can turn.

The bait-supporting member is shown at 15 and it is carried by an arm 16 that is bent to present the offset transversely-extending portion 17 that is mounted for turning movement in a bearing 18 carried by the base, said portion 17 constituting the axis about which the bait-holding member can swing. The bait-holding member has associated therewith a locking member 180 which normally overlies the end of the arm 13 and by its engagement with the arm holds the catch 8 in its operative position. This locking member 180 can conveniently be made from the same piece of wire from which the arm 16 is made, the latter being bent to present the offset portion 17 and then being bent again to present the locking member 180. 19 is a spring, one end of which is connected to the locking member 180 and the other end of which is connected to an arm 20 extending from the part 9. The normal action of this spring is to hold the bait-supporting member 15 elevated and the locking member 180 in a position over the end of the arm 13 thereby locking the catch in its operative position. Since this spring is fastened to the arm 20 it also tends to rock the catch 8 and to depress the arm 13 thereof.

In order to set the trap the operator merely swings the striker 2 from the dotted to the full line position Fig. 1. As the striker approaches the full line position it engages the inclined face 11 of the nose 12 and forces the nose backwardly sufficiently to permit the striker to pass the nose. When the striker first engages the inclined face 11 it will swing the catch backwardly about the portion 9 until the end of the arm 13 engages the locking member 180, as shown in Fig. 3. The engagement of the end of the arm 13 against the locking member 180 prevents further swinging movement of the catch bodily about its axis 9, but by applying a little pressure to the striker, the catch will yield sufficiently to permit the striker to pass the nose 10. This is provided for by making the catch of a material which is slightly resilient so that by appling a little pressure to the striker it can be forced past the nose, as clearly seen in Fig. 3. When the striker has been thus carried past the nose the spring 19, together with the resiliency of the catch carries the nose over the striker sufficiently to engage the latter and lock it in the full line position Fig. 1. During this entire operation of setting the trap the end of the arm 13 is maintained underneath the locking member 180 and the catch is, therefore, continuously locked. No hand manipulation of the catch or the locking member 180 is, therefore, required to lock the catch in its operative position after the striker has been moved over into its full line position.

After the trap is set it is sprung by depressing the bait-supporting member 15. The depression of the bait-supporting member turns the shaft 17 and carries the locking member 180 off from the end of the arm 13 thereby releasing the catch and allowing the striking member to swing forward under the influence of its spring 5.

The striker 2 is made parti-circular at its end so that it will strike an animal nibbling at the bait regardless of the angular position of the animal. This makes a trap which will operate with equal effectiveness to catch a small and a large animal.

The base 1 is shown as provided with the extension 22 which is thinner than the base and which is situated beyond the striker. This extension provides a hand-hold by which the trap can be carried when it is set without danger of the person carrying it being struck or injured by the striker in case the trap should be accidentally sprung. I have also provided the base with an aperture 230 at its opposite end situated beyond the catch. This aperture provides means by which the trap may be hung up when not in use, and also provides a thumb-pole by which it may be carried.

It will be seen from the above that the setting of the trap involves simply the act of swinging the striker from the dotted to the full line position Fig. 1, said striker becoming automatically locked during this movement. This is an important feature as it provides a trap which can be set by a child or any inexperienced person without danger.

The spring 19 has the further advantage that it normally holds the locking member 180 in position over the end of the arm 13 thereby maintaining the operative relation between the locking member 180 and arm 13, even though the trap is held bottom side up or in any other position.

My trap is very simple in its construction, is easy to set, and is effective in operation.

I claim:

1. In an animal trap, the combination with a base, of a spring-impelled striker pivotally connected thereto, a pivoted catch for holding the striker set, said catch having an arm, a pivotally-mounted bait-holding member having associated therewith a locking element to engage said arm and lock the catch in operative position, and a spring connection between the locking element and catch.

2. In an animal trap, the combination with a base, of a spring-impelled striker pivotally connected thereto, a pivoted catch for holding the striker set, said catch having an arm, a pivotally-mounted bait-holding member having associated therewith a locking element to engage said arm and lock the catch in operative position, and yielding means for holding the locking member in operative locking engagement with the arm of the catch.

3. In an animal trap, the combination with a base, of a spring-impelled striker pivotally connected thereto, a pivoted resilient catch for holding the striker set, said catch having an arm, a pivotally-mounted bait-holding member having associated therewith a locking element to engage said arm and lock the catch in operative position, and yielding means to hold the locking element in operative locking engagement with said arm.

In testimony whereof, I have signed my name to this specification.

GEORGE E. BROWN.